United States Patent [19]

Citta

[11] Patent Number: 4,941,049
[45] Date of Patent: Jul. 10, 1990

[54] TELEVISION SYSTEM USING REVERSING SCAN WHICH MINIMIZES GHOST VISIBILITY

[75] Inventor: Richard W. Citta, Oak Park, Ill.

[73] Assignee: Zenith Electronics Corporation, Glenview, Ill.

[21] Appl. No.: 298,394

[22] Filed: Jan. 17, 1989

[51] Int. Cl.$^5$ .............................................. H04N 7/00
[52] U.S. Cl. ..................................... 358/187; 358/83; 358/905; 358/242
[58] Field of Search ............... 358/167, 186, 187, 242, 358/1, 83, 905, 140

[56] References Cited

U.S. PATENT DOCUMENTS

| | | | |
|---|---|---|---|
| 2,386,087 | 10/1945 | Bingley et al. | 358/187 |
| 2,386,088 | 10/1945 | Bingley et al. | 358/187 |
| 2,498,391 | 2/1950 | Bingley et al. | 358/187 |
| 3,542,951 | 11/1970 | Wolff | 358/217 |
| 3,662,102 | 5/1972 | Herndon | 358/83 |
| 4,672,449 | 6/1987 | Kraus et al. | 358/242 X |

Primary Examiner—James J. Groody
Assistant Examiner—Mark R. Powell

[57] ABSTRACT

A transmission system for minimizing the visibility of ghost images develops a transmission signal having groups of video information alternately reversed at the group rate. The resultant signal corresponds to a signal generated by scanning an image in one direction for a predetermined time and scanning the image in the opposite direction for a predetermined time. The transmitted signal and any ghost signals received by a receiver result in a pair of ghost images, one on each side of the real image. The visibility of the ghost image is reduced by approximately one-half. In one version, video processing is reversed on a horizontal line basis. In the field version of the invention, video processing is reversed for each successive field and successive pairs of fields are averaged in the receiver to minimize flicker of the ghost images.

11 Claims, 6 Drawing Sheets

FIG. 5
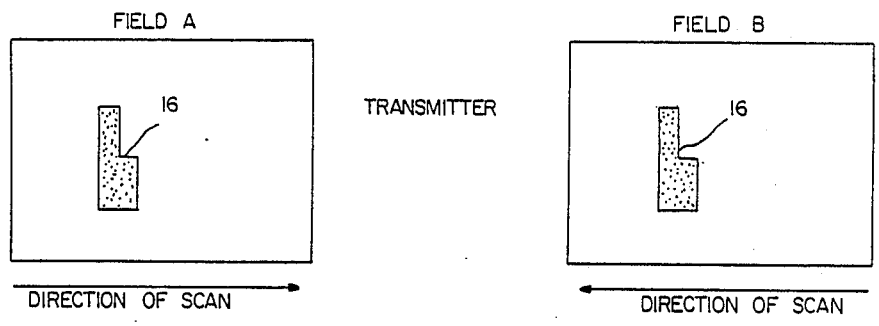
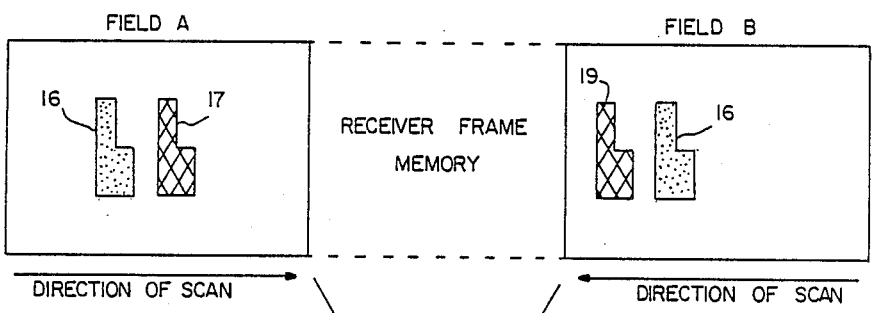
FIG. 6
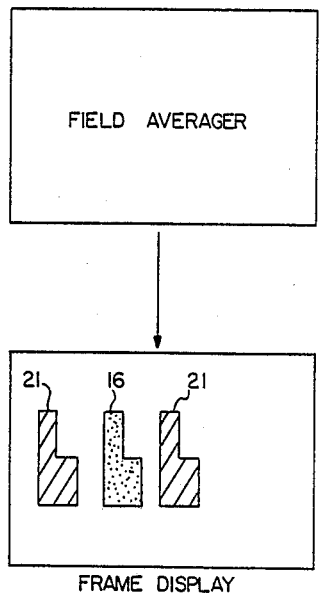

TELEVISION SYSTEM USING REVERSING SCAN WHICH MINIMIZES GHOST VISIBILITY

BACKGROUND OF THE INVENTION AND PRIOR ART

This invention relates generally to television signal transmission systems and specifically to a novel television transmission system and method having reduced ghost visibility.

An ever-present problem of television signal transmission and receiving systems has been that of ghost video images, simply referred to as ghosts. A video ghost or ghost image is developed by an electrical signal that is identical to the main or real signal, but displaced in time. The ghost signal travels a longer path and thus has a longer propagation time from the transmitter to the particular receiver, as compared with the real signal. Generally, ghost signals are created by reflection from objects that lengthen their transmission paths and it is not uncommon to encounter multiple ghost signals. Video ghosts are very often disconcerting to a viewer since the ghosts are lower intensity images that are displaced from the real images. The amount of the displacement is a function of the transmission delay between the real and the ghost electrical signal and the ghost signal intensity is a function of signal amplitude. Consequently, ghost images are variable and depend upon a number of factors, including the position of the transmitter, the location of the receiver and the terrain between the transmitter and the receiver.

The prior art reveals many attempts to cancel or minimize ghost images in television receivers. The major difficulty in developing a "ghost cancellation" system is that every transmitter and receiver combination presents a unique problem. Further, the problem may not remain static, that is, it may change depending upon changes in the physical environment in which the transmitter and receiver are located. For example, a particular television receiver installation may have a system installed for perfectly cancelling ghost signals from a particular transmitter. Yet, the later erection of a tall building that disturbs either the real or the ghost signal transmission path (or both) between the transmitter and the receiver will disrupt the ghost cancelling system.

As mentioned, the video ghost appears as a displaced image of lower intensity, depending upon its signal strength. If the electrical ghost signal achieves a level that approaches 25–30% of the real signal level, the receiver synchronization circuits will be unable to reliably discriminate between the two signals and no viewable picture will be possible. Consequently, not only are ghost signals disturbing in terms of viewer display, they can render viewing impossible.

The system of the invention does not cancel ghost signals. It does, however, minimize the visibility of ghost signals by reducing their amplitude by an additional 50% with respect to the real signal. With the invention, the real video image is flanked by a pair of symmetrical, reduced visibility ghost images. The symmetrically disposed ghost images of lesser visibility actually enhance the video presentation in many instances since they help to define the true center of the real image. In alphanumeric displays, for example, conventional ghost images are most objectionable because the eye has difficulty in distinguishing edges in the presence of strong ghost images. The symmetrical disposition on opposite sides of the real image of two ghost images of lesser but equal visibility helps the eye to concentrate on and to define the edges of the real image. Thus with the invention, displays of textual material become much more legible.

OBJECTS OF THE INVENTION

A principal object of the invention is to provide a novel television signal transmission system and method.

Another object of the invention is to provide a television signal transmission system and method that inherently minimizes the visibility of ghost images.

BRIEF DESCRIPTION OF THE DRAWINGS

These and other objects and advantages of the invention will become apparent upon reading the following description in conjunction with the drawings, in which:

FIG. 5 is a simulation of a video image scanned by a transmitter operating in accordance with the method of the invention in its first form;

FIG. 6 is a series of pictures useful in explaining the inventive method of FIG. 5.

DESCRIPTION OF THE PREFERRED EMBODIMENT

Generally, a ghost signal trails the real signal, that is, its arrival at a receiver is delayed. The real signal is assumed to travel a more direct route between the transmitter and the receiver and therefore not only arrives earlier than reflected (ghost) signals but has greater signal strength. The invention involves processing a video image signal at a transmitter to alternately reverse the scanning direction of the video or picture elements, on either a line or a field basis. Transmitting a signal with the image elements thus arranged results in any ghost signals that may be received (by an appropriately equipped receiver) producing two less intense symmetrically disposed ghost images about the real image. This may be accomplished at the transmitter by alternately scanning the scene in opposite directions, on either a line or a field basis, or by writing groups of picture element information or data to a pair of line memories (or to a frame memory) and reading the memory to correct the sequence of successive groups of picture elements. The term group is used to designate either a horizontal line or a field of video, which conventionally implies a scanning direction. Also, video may be in pixel form as well as continuous or analog form. The result is to develop a transmitted video signal that appears to have been developed by scanning the scene in opposite directions. In a system where the processing reverses the "video direction" for successive fields, a frame memory in the receiver may be employed to prepare the signal information for display by a conventional cathode ray tube (CRT). Using the information in the frame memory to control scanning of a video display will produce the real image and two half amplitude ghost images symmetrically displaced about the real image. While the relative visibility (brightness) of the ghost images will be determined by the gain characteristic of the CRT, in all cases the ghost images will be significantly less visible than the real image.

In such a field reversal processing system, the video ghost image will alternate positions on either side of the real image at the field rate. This could result in noticeable flicker of the ghost images and partially negate the benefits obtained from their reduced visibility. To eliminate this possibility, successive fields may be averaged in a field averager in the receiver. It will be appreciated that in a line reversal processing system, where the sequence of transmitted video information for each horizontal line is in the opposite direction from the preceding line, the normal interlacing of the horizontal lines in conventional television practice would obviate flicker, without the need to use line averaging. Yet horizontal line averaging may be utilized in an optimum system for obtaining a very stable video display with ghost minimization.

Figure 1:
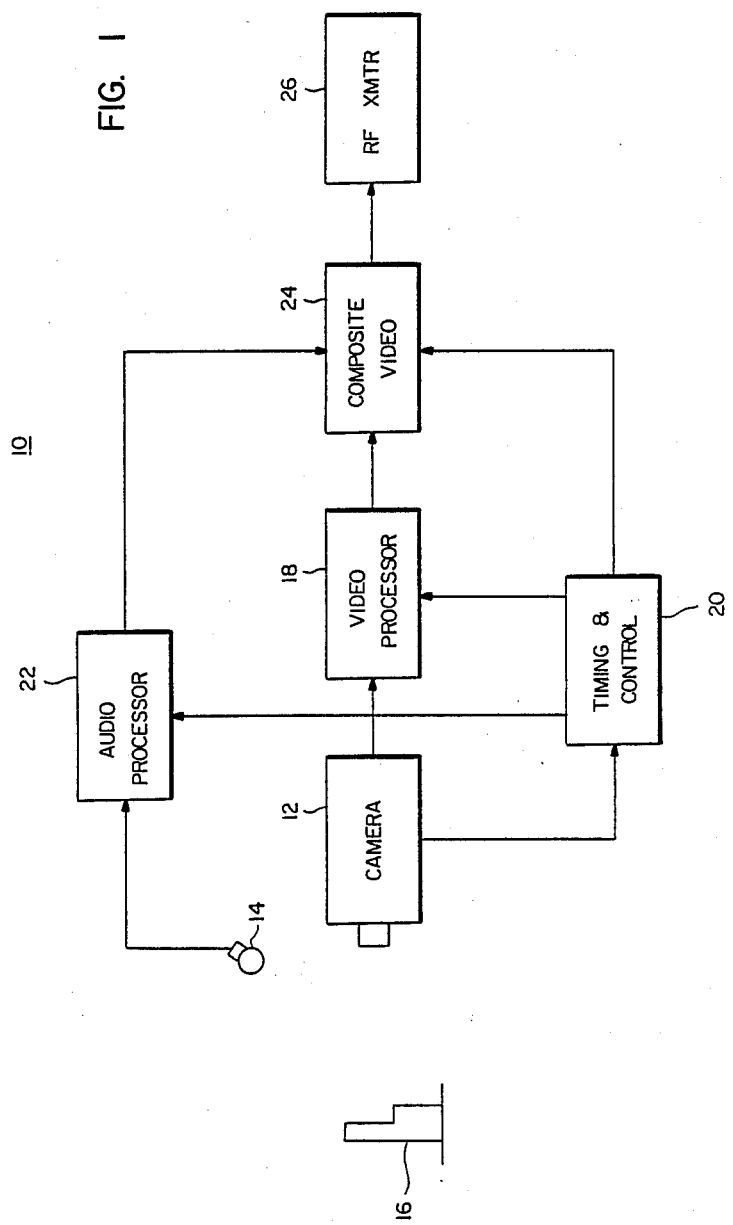
FIG. 1 is a simplified block diagram of a transmitter operating in accordance with the inventive method.

In FIG. 1, a transmitter 10 includes a camera 12 and an audio pickup or microphone 14 that are positioned to "view" and to obtain signals pertaining to an image 16. The camera 12 includes well known means for scanning image 16 and for developing electrical signals that are applied to a video processor 18 and to a timing and control circuit 20. The signals from microphone 14 are applied to an audio processor 22. Audio processor 22 and video processor 18 supply output signals, under control of timing and control circuit 20, to a composite video processor circuit 24. The output of the composite video circuit 24 is supplied to an RF transmitter 26 for transmitting the resultant television signal. It will be noted that, in accordance with the invention, scanning of image 16 is performed on either an alternate line reversal or an alternate field reversal basis. Consequently, the signal that is transmitted by RF transmitter 26 has groups of video information that are alternately reversed, either on a line or a field basis, depending upon the particular arrangement employed.

Figure 2:
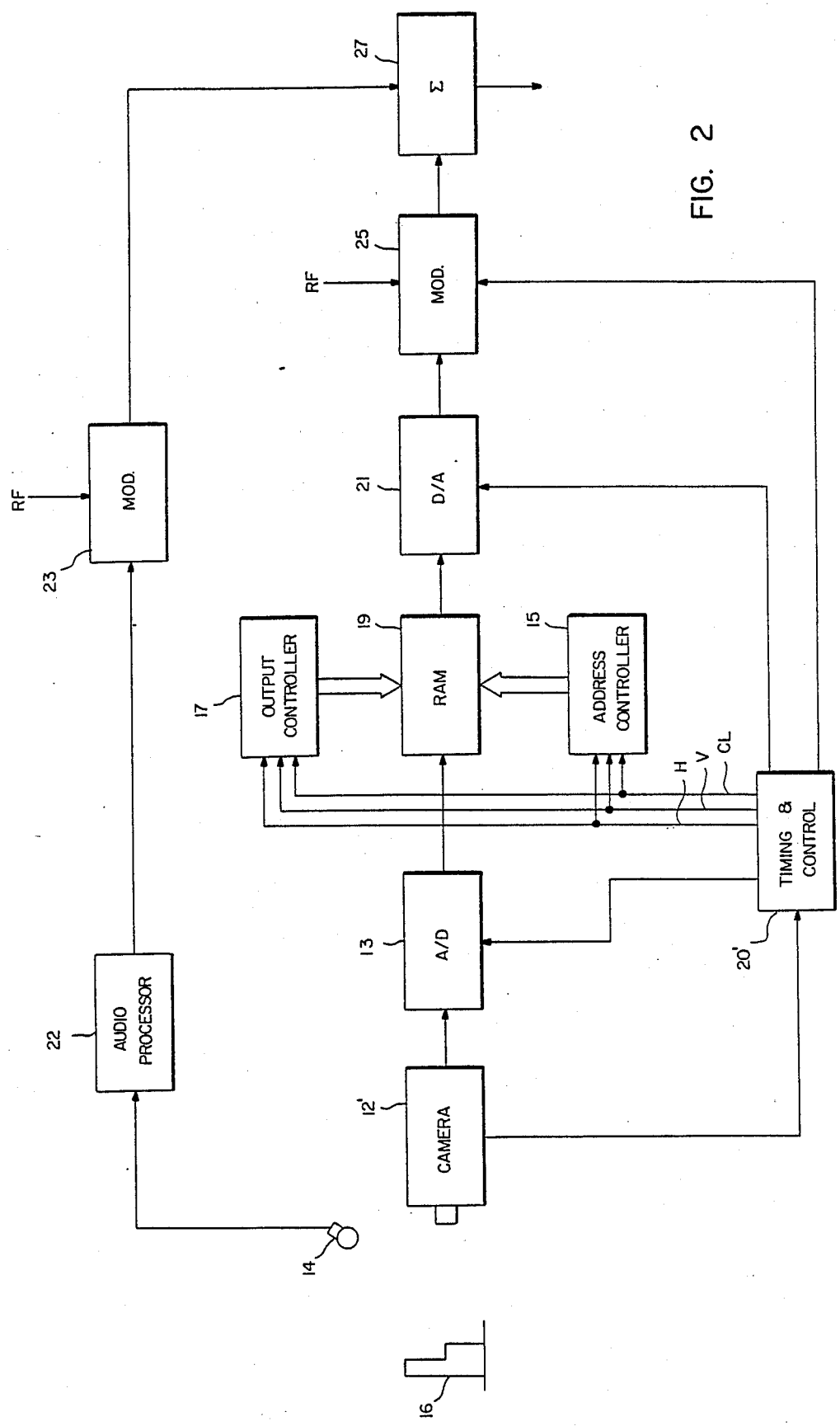
FIG. 2 is a simplified block diagram of a modified transmitter using the inventive method.

In FIG. 2, a camera 12' and a microphone 14 view a scene 16 and camera 12' supplies an output signal to an analog to digital (A/D) converter 13. Under control of timing and control circuit 20', A/D converter 13 produces digital output signals corresponding to the input video signals. The output of A/D converter 13 is supplied to a RAM 19 which may either be a whole frame memory or a two horizontal line memory depending upon whether the line or the field processing mode is being utilized. RAM 19 is a two port memory that may be written to and read from simultaneously by an address controller 15 and an output controller 17, respectively. Timing and control circuit 20' supplies horizontal (H), vertical (V) and a high frequency clock (CL) signals for controlling data transfer. The individual pixel elements of RAM 19 are controlled by address controller 15 which is operated under control of timing and control circuit 20'. The incoming video information is digitized by A/D converter 13 and the groups of video data are supplied to RAM 19 in a particular sequence. The output controller 17 is also coupled to RAM 19 and controls the readout of the video information stored therein. Output controller 17 is also operated under the control of timing and control circuit 20'. The output of RAM 19 is supplied to a digital to analog (D/A) converter 21 which is operated under control of timing and control circuit 20' to reconvert the digital information into analog form. The output of D/A 21 is supplied to a modulator 25 where it modulates an RF carrier. The output of modulator 25 is supplied to a summation circuit 27 which also receives signals from audio processor 22 that is RF modulated in modulator 23. The television signal with video and audio is then transmitted. As mentioned, RAM 19 is either a two line memory or a two-field, i.e. a full frame memory. In the latter instance, the information from A/D converter 13 is sequentially loaded into RAM 19 under control of address controller 15. The information is read out under control of output controller 17 by reading one line of RAM 19 in one direction and the next or succeeding line in the opposite direction, and so forth. The result is that the output of RAM 19 consists of successive groups of video pixel information in reverse order. The effect is the same as that produced in the transmitter of FIG. 1 where the scene is scanned in one direction for a line or frame and then scanned in the opposite direction for a successive line or frame.

Figure 3:
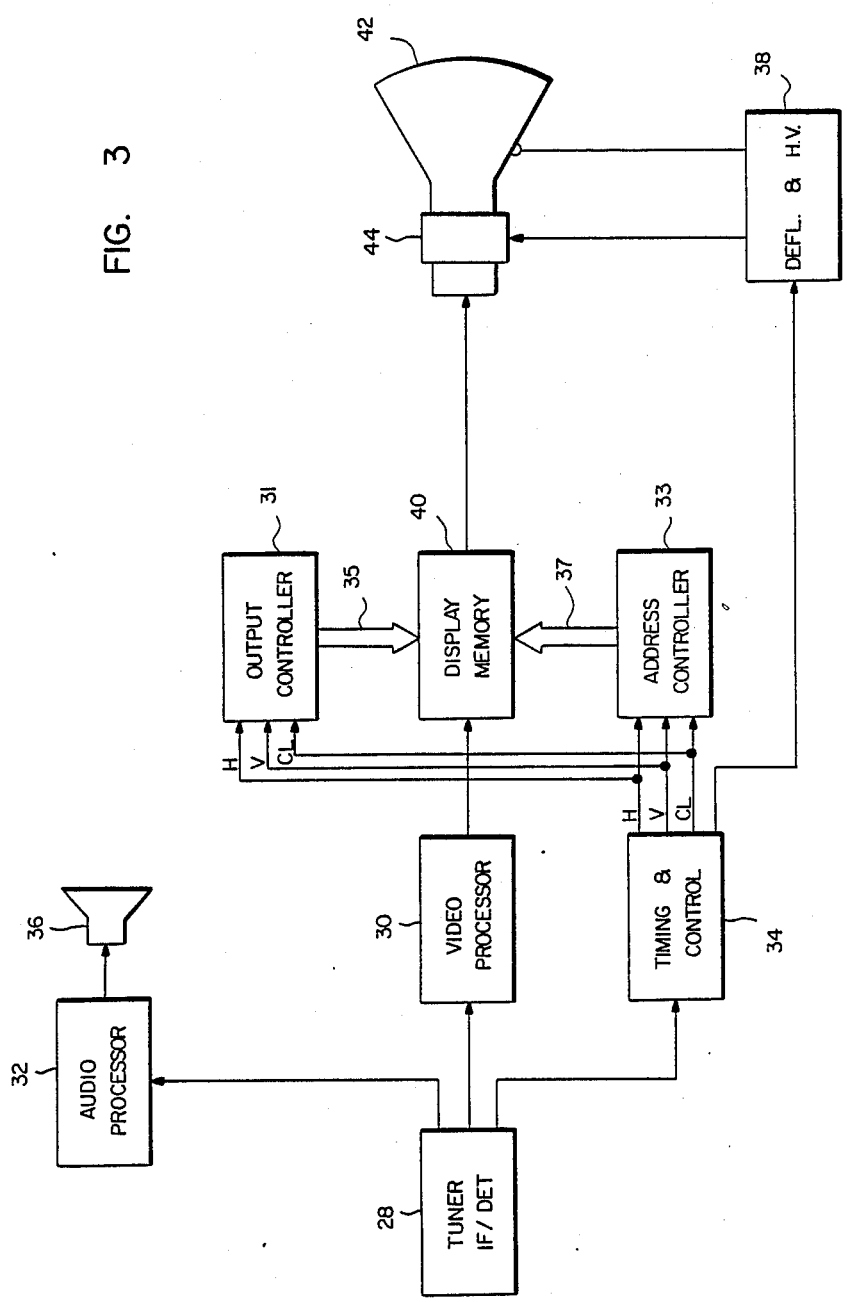
FIG. 3 is a simplified block diagram of a receiver operating in accordance with a first form of the inventive method.

The receiver of FIG. 3 includes a tuner IF/detector 28 for receiving and demodulating the signal from the transmitter of FIG. 1 or from the transmitter of FIG. 2, both of which are assumed to operate in accordance with a first form of the invention, namely alternate field processing. One output of tuner IF/detector 28 is supplied to a video processor circuit 30, another output is supplied to an audio processor circuit 32, and still another output is coupled to a timing and control circuit 34. Audio processor circuit 32 drives a conventional loudspeaker 36 where the audio accompaniment of the transmitted television signal is reproduced. The video processor circuit 30 operates to recover the video information, under control of timing and control circuit 34, and to supply it to a display memory 40. An output controller 31 and an address controller 33 are respectively coupled to display memory 40 by buses 35 and 37. Display memory 40 is also a two port memory which can have data written to it from video processor 30 by address controller 33 while simultaneously having video data read out and supplied to CRT 42 by output controller 31. The controllers are supplied with horizontal (H), vertical (V) and clock (CL) timing signals from timing and control circuit 34. Timing and control circuit 34 also provides control signals for a deflection and high voltage circuit 38 that develops the high voltage for a CRT 42 and deflection currents for a yoke 44 that is positioned on the neck of CRT 42. The output of display memory 40 is coupled to the cathodes (not shown) in CRT 42. Display memory 40 may comprise a frame memory for storing (and averaging) two fields of video data which are supplied, under the control of controller 31, in a sequential fashion to CRT 42 for modulating the scanned electron beams. Averaging of the two fields of data to eliminate any ghost image flicker is the preferred implementation.

Figure 4:
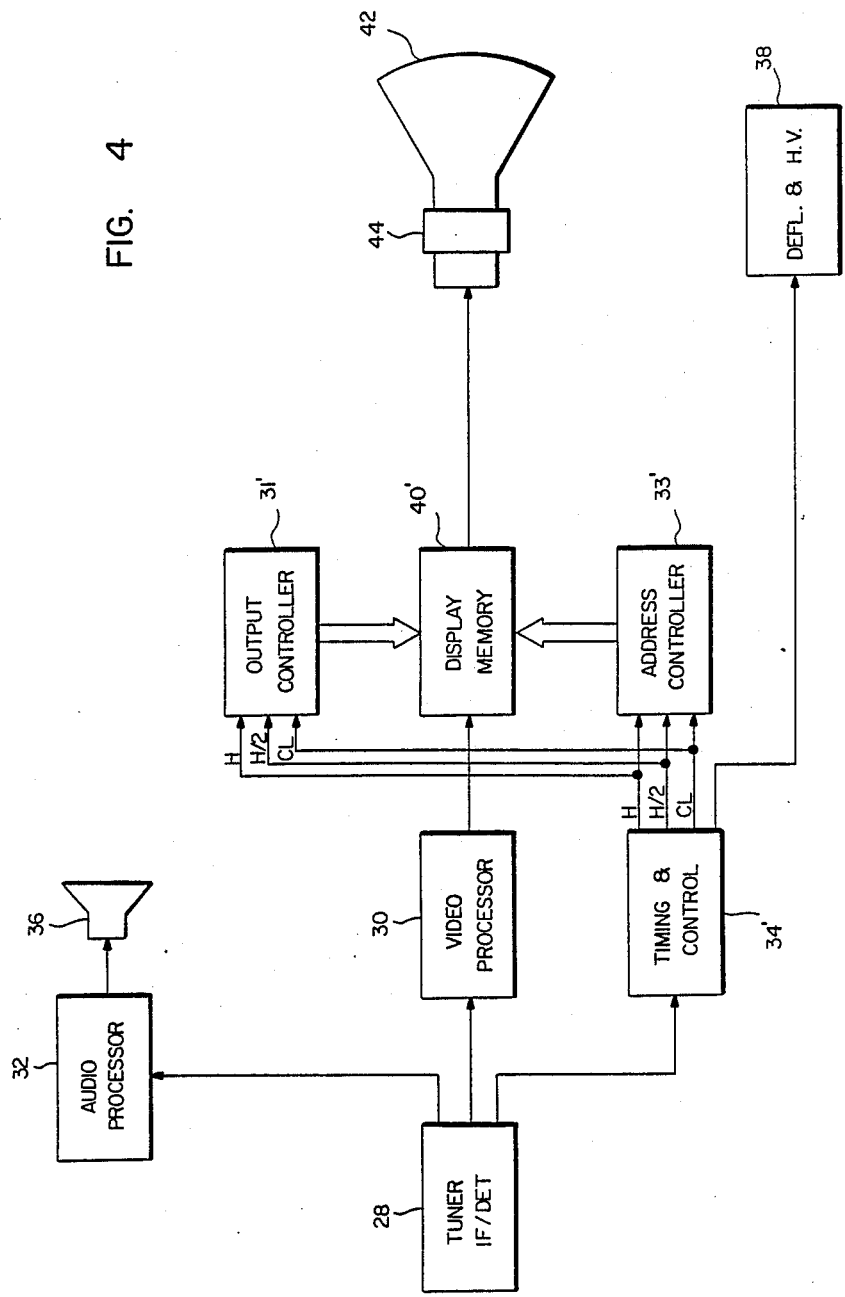
FIG. 4 is a simplified block diagram of a receiver operating in accordance with a second form of the inventive method.

FIG. 4 shows a receiver, similar to that of FIG. 3, that is arranged to operate with signals received from a transmitter (FIGS. 1 or 2) that is operated in accordance with a second form of the invention, namely alternate line scanning. The circuits are identical except for timing and control circuit 34', output controller 31', address controller 33' and display memory 40'. The display memory 40' is a two-line memory (that may also include a line averaging circuit). The memory has video data written to it by address controller 33' and video data read out by output controller 31'. The signals from timing and control circuit 34' are a high frequency clock CL, a horizontal rate timing signal H and a one-half horizontal rate (H/2) signal. The H/2 signal is responsible for changing the direction of addressing when writing the data in.

FIG. 5 shows a simulation of real image 16 as it would appear with Field A having one direction of scan and Field B having the opposite direction of scan. FIG. 6 shows a simulation of a receiver frame memory with Field A including a dotted real image 16 with a cross hatched ghost image 17 displaced to the right. The cross hatching indicates that the ghost image 17 is less visible (intense) than the real image 16. Field B shows real image 16 with a cross hatched ghost image 19 displaced an equal distance to the left. The real images 16 in both Field A and Field B are, of course, coincident. The data in Fields A and B are applied to a field averager where the Field A and Field B data are essentially summed together. The result is that the frame display illustrates real image 16 flanked by a pair of identical ghost images. The single hatching of the ghost images is intended to show that the ghost images 21 are much less intense than the real image 16 since the amplitudes of the ghost signals are divided by two in the field averager.

Figure 7B:
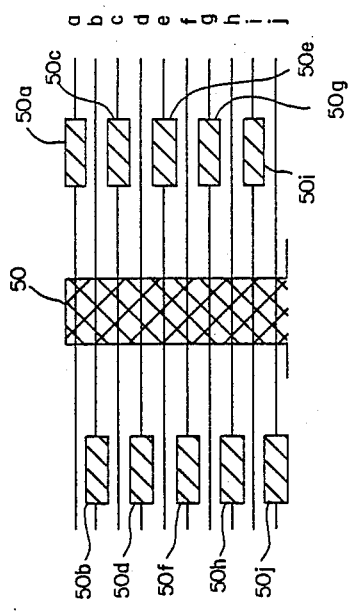
FIGS. 7A and 7B are a partial, enlarged simulations of a video display produced with the second form of the inventive method.
Figure 7A:
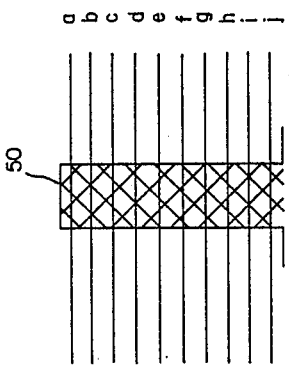

FIGS. 7A and 7B illustrate the effect of video line scan reversal. An image 50 is shown in FIG. 7A with arbitrary scanning lines indicated by the letters a–j. It will be appreciated that the scanning lines are actually much thicker, corresponding in thickness to image elements 50a, 50b . . . 50j as shown in FIG. 7B. Real image 50 is flanked by a pair of ghosts made up respectively of image elements 50b, 50d, 50f, 50h and 50j and of image elements 50a, 50c, 50e, 50g and 50i. Because of the high horizontal scan frequency, the human eye cannot resolve the separate image elements and the display will appear the same as that in FIG. 6. Yet, a line averager circuit would yield absolutely identical flanking ghost signals, with no actual flicker.

As those skilled in the art will perceive, the need to provide special memory addressing for writing and reading the video data into and out of the memory may be obviated by reversing the electron beam scanning direction of the CRT. Systems for reverse scanning of CRTs are known in the art and require no further description here. The difficulty with such systems is in the linearity or uniformity of scanning and any deficiencies will be exacerbated by reversal of scanning direction. Yet such linear systems are realizable and the invention is intended to include them.

With the invention, the visibility of ghost images is greatly diminished. It is recognized that numerous modifications in the described embodiments of the invention will be apparent to those skilled in the art without departing from its true spirit and scope. The invention is to be limited only as defined in the claims.

What is claimed is:

1. A method of operating a television system for minimizing the visibility of ghost images comprising the steps of:
   formatting groups of picture elements of a video scene such that during transmission successive ones of said groups are in reverse order by writing data corresponding to said groups of picture elements in a memory and reading said data from said memory to reverse the order of said successive ones of said groups of picture elements;
   transmitting said groups of picture elements to a receiver; and
   generating a video display at said receiver having said groups of picture elements in correct order.

2. The method of claim 1 wherein each of said groups of picture elements corresponds to a line of video information.

3. The method of claim 1 wherein each of said groups of picture elements corresponds to a field of video information.

4. The method of claim 1 wherein said formatting step includes the step of:
   formatting a video signal by alternately scanning a scene in opposite directions.

5. The method of claim 4 wherein said alternate scanning is performed at a line rate.

6. The method of claim 4 wherein said alternate scanning is performed at a field rate.

7. A television signal transmission system comprising:
   means for developing an electrical video signal corresponding to groups of picture elements;
   memory means for formatting said groups of picture elements with successive ones of said groups in reverse order;
   means for transmitting said groups of picture elements to a receiver; and
   means for generating a video display at said receiver with said groups of picture elements in correct order.

8. The system of claim 7 wherein said memory means include;
   means for storing said groups of picture elements in said memory means; and
   means for reading out groups of said picture elements from said memory means such that successive ones of said groups are in reverse order.

9. The system of claim 7 further including:
   display means in said receiver;
   memory means in said receiver for storing picture elements; and
   means for operating said memory means in said receiver for alternately supplying said groups of picture elements in proper order to said display means.

10. A method of operating a television transmission system for minimizing the visibility of ghost images comprising the steps of:
    developing a video signal by alternately scanning fields of a scene in opposite directions at a field rate;
    transmitting said video signal to a receiver; and
    receiving and generating a video display from said video signal, successive pairs of said fields being averaged for minimizing flicker of said ghost images.

11. A television signal transmission system comprising:
    means for developing a video signal including groups of picture information corresponding to a scene that was subjected to alternate scanning in opposite directions at the group rate;
    means for transmitting said video signal;
    receiving means for receiving said transmitted video signal and recovering said groups of picture information;
    memory means at said receiving means; and
    means for operating said memory means to store said groups of picture information and to read out said groups of picture information in the correct sequence for display.

* * * * *